United States Patent Office 3,446,842
Patented May 27, 1969

3,446,842
PRODUCTION OF N,N-DIMETHYLFORMAMIDE
Kenzie Nozaki, El Cerrito, Calif., assignor to Shell Oil Company, New York, N.Y., a corporation of Delaware
No Drawing. Filed Aug. 4, 1966, Ser. No. 570,158
Int. Cl. C07c *103/02, 103/36*
U.S. Cl. 260—561
8 Claims

ABSTRACT OF THE DISCLOSURE

Dimethylformamide is produced by carbonylation of mixtures of amonia and methyl amines in the presence of certain cobalt-containing catalysts.

---

This invention relates to an improved method of producing N,N-dimethylformamide.

PRIOR ART

Methods of carbonylating methylamines in the presence of metal catalysts are known in the art. For example, Friederich et al., German Patent No. 948,056, Aug. 30, 1956, disclose the contacting of trimethylamine and carbon monoxide in the presence of added hydrogen and a catalyst comprising cobalt bromide and a complex of the formula $[(CH_3)_3N]_2CoBr_2I_2$ to produce a mixture of N-methyldiacetimide and N,N-dimethylacetamide. Krzikalla et al., German Patent No. 863,800, Jan. 19, 1953, disclose a similar contacting of trimethylamine and carbon monoxide in the presence of a supported catalyst comprising mixed oxides of magnesium, thorium and cobalt to produce dimethylformamide.

OBJECTS

It is an object of the present invention to provide an improved method of producing N,N-dimethylformamide, hereinafter termed dimethylformamide. More particularly, it is an object to provide an improved method of carbonylating amine-ammonia mixtures to produce dimethylformamide.

THE INVENTION

It has now been found that these objects are accomplished by the process of contacting mixtures comprising trimethylamine and ammonia, in the optional presence of other methyl amines, with carbon monoxide at elevated temperature and pressure in the presence of a cobalt carbonyl catalyst. The process of the invention is adaptable for continuous, cyclic operation and results in the formation of dimethylformamide in high selectivity.

PROCESS DESCRIPTION

The process of the invention comprises intimately contacting the trimethylamine and ammonia reactants, or preliminary reaction products thereof, with carbon monoxide in the presence of a cobalt carbonyl catalyst. The mechanism of the reaction is not understood with certainty, but it is apparent that the overall reaction is complex in nature possibly involving exchange of methyl groups between the trimethylamine and ammonia reactants and/or various amide products, as well as carbonylation of amine reactants to produce the observed amide products. It is known that under the reaction conditions employed, appreciable quantities of dimethylformamide are not produced by direct carbonylation of trimethylamine. Therefore, some interaction between the ammonia and trimethylamine reaction mixture components is considered to take place to form amine products, e.g., dimethylamine or methylamine, which do serve as precursors of dimethylformamide. It is also known that trimethylamine and ammonia do undergo a reaction over certain strongly acidic catalysts involving exchange of methyl groups to produce an equilibrium mixture containing dimethylamine and methylamine as well as ammonia and trimethylamine. However, the process of the invention results in a greater proportion of formamide products than could be obtained by simple carbonylation of the primary and secondary amines present in the equilibrium mixture, and carbonylation products corresponding to dimethylamine are produced to the relative exclusion of those products corresponding to methylamine.

PROCESS CONDITIONS

The trimethylamine and ammonia, or preliminary reaction products thereof, are contacted with carbon monoxide in the presence of the catalyst. No special precautions are required with regard to the introduced reaction mixture components and commercially available grades of these materials of reasonable purity are satisfactory. The method of reactant contacting is not critical and in one procedure the process is conducted in a continuous manner as by contacting the reactants and catalyst during passage through a tubular reactor. In a second procedure, the reaction is conducted in a batchwise manner by charging reactants and catalyst to an autoclave or similar pressure reactor. By either procedure, the entire amounts of reactants may be initially charged to the reaction zone although it is also useful to add one or more reaction mixture components to the others in increments or in an addition subsequent to initial contacting, as by mixing the ammonia and trimethylamine in the presence of the catalyst and subsequently adding at least a portion of the carbon monoxide.

The process is conducted in one reaction modification by introducing trimethylamine and ammonia as such along with carbon monoxide and the cobalt carbonyl catalyst into the reaction zone wherein carbonylation is effected. In this modification, whatever interaction of the trimethylamine and ammonia is involved in the overall reaction sequence takes place in the carbonylation zone in the presence of the cobalt carbonyl catalyst which additionally serves to catalyze carbonylation of the mixture to produce dimethylformamide. The molar ratio of trimethylamine to ammonia is not critical and molar ratios from about 1:10 to about 10:1 are satisfactory. Best results are obtained when an at least stoichiometric amount of ammonia is employed, i.e., a molar amount of ammonia of at least half that of the trimethylamine. Molar ratios of trimethylamine to ammonia from about 1:6 to about 1:2 are preferred.

In this modification, suitable reaction temperatures within the carbonylation zone are from about 150° C. to about 275° C. with temperatures from about 175° C. to about 250° C. being preferred. Suitable pressures of carbon monoxide within the carbonylation zone are pressures from about 1000 p.s.i.g. to about 6000 p.s.i.g. at reaction temperature although pressures from about 1500 p.s.i.g. to about 2500 p.s.i.g. are preferred.

In a second and generally preferred reaction modification, the trimethylamine and ammonia of the introduced mixture are allowed to interact in the presence of an acidic catalyst prior to being contacted with carbon monoxide in the carbonylation zone. Contact of the trimethylamine and ammonia with an acidic catalyst serves to promote the conversion of the introduced reactants to the resulting equilibrium mixture containing methylamine and dimethylamine as well as the introduced ammonia and trimethylamine, which equilibrium mixture is then passed to the carbonylation zone where contact with carbon monoxide and the cobalt carbonyl catalyst is effected.

Although numerous acidic materials are in part operable in the pretreatment of the trimethylamine and ammonia mixture, the preferred acidic catalysts comprise acidic, normally-solid, heterogeneous, inorganic oxide catalysts of at least two elements other than oxygen at least one of which is a metal, as illustrated by mixed oxide salts wherein at least one element other than oxygen is present in the anion, by inorganic acidic oxide materials known as siliceous refractory oxides and by heteropoly acids or salts thereof.

One class of suitable acidic oxides, i.e., the materials known as heteropoly acids, is described in some detail in "Modern Aspects of Inorganic Chemistry," by H. J. Emeleus et al., second edition (1952), pp. 207–209. The heteropoly acids are considered to be formed by the union of varying numbers of inorganic acid anhydride molecules, particularly tungstic oxide molybdic oxide or vanadium pentoxide, with a second inorganic acid, one molecule of which is regarded as serving as the central atom or central ion of the complex heteropoly acid structure. Of particular importance are the 6-poly and the 12-poly acids wherein the acidic anhydride is combined with the central acid in a molecular ratio of 6:1 or 12:1 respectively. Typical heteropoly acids include phosphotungstic acid, phosphomolybdic acid, silicotungstic acid, phosphovanadic acid, and phosphomolybdictungstic acid. Also suitable, although less preferred, are partial salts of the heteropoly acids, for example, the acid salts of the heteropoly acid with sodium, barium, copper and lead.

In another modification of the process of the invention, the catalyst is a siliceous refractory oxide, which term includes synthetic components as well as acid treated clays and similar materials and acid forms of crystalline aluminosilicates known in the art as molecular sieves. Suitable synthetic siliceous catalysts include silica-alumina, silica-magnesia, alumina-boria, silica-alumina-titania, silica-alumina-zirconia, silica-magnesia-alumina and the like, while natural zeolites are illustrated by mordenite, chabazite and erionite. In many instances, the activity of the natural zeolytic materials is greatly enhanced by conventional acid treatments prior to the use thereof as catalysts in the instant process.

Also suitable as acidic catalysts are mixed oxide catalysts wherein one element present may be considered to be present in the anion, for example, boron phosphate, copper silicate, copper phosphate, cobalt vanadate, calcium nickel phosphate, copper barium phosphate and the like, as well as the class of acidic mixed oxide materials known as the chromites. The class of chromites, of somewhat indefinite composition, is characterized by the presence therein of approximately equimolar proportions of chromium oxide and an additional metal oxide, typically a Group I–B metal oxide, and is illustrated by copper chromite, silver chromite and gold chromite. The chromite catalysts are employed as such or with the additional optional presence of up to about 20% by weight of other metal oxides, e.g., up to about 20% by weight of a Group II metal such as barium, calcium, zinc or cadmium.

The acidic catalysts are employed as unsupported materials or are supported on inert carriers such as diatomaceous earth, pumice, crushed brick, silica gel or the like. The catalyst, when supported, is introduced onto the carrier in any suitable manner, for example, as by impregnation of the carrier with a cogellation of a heteropoly acid, or by ion exchange of the desired metallic ions into an oxide carrier structure. The final composition is customarily calcined or reduced in an atmosphere of hydrogen or like reducing agent to obtain the appropriate active form. The optimum amount of catalyst to be employed on a carrier will largely be determined by the particular catalyst and carrier employed; however, amounts of catalyst from about 0.1% by weight to about 25% by weight of the total mixture are generally satisfactory. As previously stated, the presence of catalyst support is not required as it is within the contemplated scope of the invention and is frequently to be preferred that the acidic oxide catalyst be employed in an unsupported form.

The conversion to equilibrium mixture in the vapor phase appears to be favored by elevated temperature, so that best results are obtained when the process is conducted under such conditions. Reaction temperatures of from about 300° C. to about 500° C. are suitable with the temperature range from about 350° C. to about 500° C. being preferred. Typical reaction pressures vary from about 1 atmosphere to about 500 atmospheres, preferably from about 3 atmospheres to about 200 atmospheres.

The conversion to equilibrium mixture is conducted in a batchwise manner, as by charging the reactants and catalyst to an autoclave or similar reactor which is maintained at reaction temperature. Alternatively, and preferably, the process is conducted in a continuous manner as by passing the reactants through a tubular reactor wherein the catalyst is contacted. By either method, one reactant may be added to the other in increments, as by adding one reactant to the other at intervals while the mixture is passing through a continuous-process reactor, although it is also useful to initially mix the entire amounts of all reactants.

Subsequent to pretreatment over the acid catalyst, the resulting mixture is passed to the carbonylation zone wherein contact is made with carbon monoxide and the cobalt carbonyl to produce the desired amide product. Contact with carbon monoxide is suitably made prior to or during residence within the carbonylation zone and carbonylation is conducted in the manner described above.

In yet another although generally less preferred modification the solid acidic catalyst is present within the carbonylation zone together with the cobalt carbonyl carbonylation catalyst to promote interaction of nitrogen-containing species prior to and/or during carbonylation.

The presence within the reaction mixture of an inert diluent appears to provide no detrimental effect and, if desired, inert normally-liquid diluents such as hydrocarbons free from aliphatic unsaturation, e.g., hexane, heptane, cyclohexane, decane, benzene, toluene, tetrahydronaphthalene and the like, or inert normally-gaseous diluents such as nitrogen, argon or helium may be utilized. However, no apparent advantages arise through the use of a reaction diluent and in the preferred modification no added diluent is employed. It is required that the reaction be conducted in an essentially inert reaction environment and the presence of substantial quantities of reactive materials such as oxygen, hydrogen, water and the like is preferably avoided.

THE CATALYST

The precise character of the catalytic species is not known with certainty. It is considered likely that the catalytic species is a complex of cobalt with ligands selected from the carbon monoxide, ammonia or the methyl amines present in the reaction mixture. In general the catalyst is characterized as a complex of from 2 to 3 atoms of cobalt with from 1 to 4 carbon monoxide ligands for each cobalt atom present and up to 2 ligands per cobalt atom selected from ammonia and a methylamine, i.e., methylamine, dimethylamine or trimethylamine. In a preferred modification, the catalyst is represented by the formula $$[Co(E)_6][Co(CO)_4]_2$$

wherein E independently is ammonia or a methylamine. Complexes of this type have been shown to be formed by interaction of ammonia and dicobalt octacarbonyl, e.g., see Hieber et al., Z. anorg. u. allgem. Chem., 232, 17 (1937), or by reaction of dicobalt octacarbonyl with amines, e.g., see Wender et al., J. Am. Chem. Soc., 74, 1216 (1952). The complexes are suitably preformed and added as such to the reaction mixture or are formed in situ as by reaction of the ammonia and the methylamines present in the reaction mixture with dicobalt octacarbonyl or analogous complexes of other amines or amides.

In the carbonylation zone, the cobalt carbonyl is employed in catalytic amounts, i.e., molar amounts that are equal to or less than the amount of trimethylamine. Molar ratios of the cobalt carbonyl to trimethylamine from about 1:100 to about 1:1 are satisfactory. Preferred, however, are molar ratios of cobalt carbonyl to trimethylamine from about 1:25 to about 1:2. In some applications it may be preferable to employ the catalyst on an inert, neutral support, e.g., silica, alumina or the like, but in the preferred modification the cobalt carbonyl is employed as an unsupported catalyst.

Subsequent to reaction, the product mixture is separated and the dimethylformamide is recovered by conventional means, e.g., fractional distillation, selective extraction and the like. In a preferred modification of the recovery procedure, advantage is taken of the fact that the desired dimethylformamide product has a higher vapor pressure and therefore lower boiling point that the other normally-liquid product mixture components. Thus, it is possible to separate the dimethylformamide from the amide product mixture in the vapor phase, subsequent to removal of the normally-gaseous and low-boiling product mixture components, e.g. carbon monoxide and unreacted amine, and recycle the higher-boiling components to the carbonylation zone or the pretreatment zone for further reaction. Unreacted starting materials or reaction intermediates are also suitably recycled.

The product of the invention, dimethylformamide, is a chemical of commerce useful, for example, as a solvent for polymeric materials such as polyacrylonitrile fibers.

To further illustrate the improved process of the invention, the following examples are provided. It should be understood that the details thereof are not to be regarded as limitations as they may be varied as will be understood by one skilled in this art.

EXAMPLE I

A series of runs was made wherein a determined amount of dicobalt octacarbonyl was charged to a pressure vessel in a nitrogen atmosphere. The vessel was closed, cooled to −80° C. and evacuated. Determined amounts of trimethylamine and ammonia were condensed into the vessel and the vessel was warmed to room temperature. Carbon monoxide was added to a pressure of 1200 p.s.i.g. at room temperature and the reaction mixture was heated and maintained at reaction temperature for the desired reaction time. The products were collected by venting the reactor through a trap maintained at −80° C. followed by evacuation of the volatile contents reactor through the trap by means of a vacuum while the reactor was maintained at 200° C. The total product weight was determined at −25° C. and the total amide product weight was determined after heating the product mixture at 50–100° C. to remove the more volatile reactants and by-products. The composition of the amide product mixture was determined by gas-liquid chromatograpic analysis. The results of this series are given in the following table wherein dimethylformamide is represented as DMF, N-methylformamide as NMF and dimethylacetamide as DMAC.

EXAMPLE II

The procedure of Example I was followed to contact 0.034 mole of trimethylamine, 0.017 mole of ammonia and 0.0014 mole of dicobalt octacarbonyl at a temperature of 225° C. and a carbon monoxide pressure of 2000 p.s.i.g. for 16 hours in the additional presence of approximately 0.4 g., 14% by weight of N-methylformamide. At the conclusion of the reaction, 3.29 g. of product was recovered, of which 0.36 g. was N-methylformamide. The total amide product was 1.99 g. and the percentage of dimethylformamide therein was 78% wt.

EXAMPLE III

A mixture having the initial composition of 0.034 mole trimethylamine and 0.017 mole ammonia was heated at 400° C. in a 50 ml. vessel containing 1 g. of silica-magnesia catalyst. The resulting initial product mixture had a composition of 0.023 mole trimethylamine, 0.010 mole dimethylamine, 0.0056 mole methylamine and 0.012 mole ammonia. This mixture was carbonylated, according to the procedure of Example I, in the presence of 0.0015 mole dicobalt octacarbonyl at an initial carbon monoxide pressure of 2000 p.s.i.g. at 225° C. for 2 hours. A total of 2.50 g. of product was collected of which 0.68 g. was amide. The percentage of dimethylformamide present in the amide product was 86% by weight and the percentage of N-methylformamide was 13% by weight. Based on the composition of the initial product mixture, the selectivity to dimethylformamide was 80% whereas the selectivity to N-methylformamide was 29%.

When a mixture of 0.034 mole of trimethylamine and 0.017 mole of ammonia was carbonylated directly under otherwise identical conditions, 2.40 g. of product was obtained of which 0.34 g. was amide. The percentage of dimethylformamide in the amide product was 83% by weight and the percentage of N-methylformamide was 15% by weight.

EXAMPLE IV

To a reactor was charged 0.034 mole of trimethylamine, 0.017 mole of ammonia and 0.0015 mole of dicobalt octacarbonyl. The reactor was pressurized with carbon monoxide and the reaction mixture was maintained at 225° C. for 16 hours. The initial carbon monoxide pressure at reaction temperature was 2000 p.s.i.g. The product was recovered by passing the product gases through traps maintained at −80° C. while the reactor was maintained at 225° C. Three product fractions were collected. The first fraction, 0.47 g., comprised 91% wt. dimethylformamide, 7% wt. N-methylformamide and 1.5% dimethylacetamide. The second fraction, 1.45 g. comprised 78% dimethylformamide, 15% wt. N-methylformamide and 3% wt. dimethylacetamide. The third fraction, 0.10 g., comprised 17% wt. dimethylformamide, 45% wt. N-methylformamide and 38% wt. N-methylacetamide. Each fraction contained less than 10 p.p.m. of cobalt.

EXAMPLE V

An active catalyst of the formula $$[Co(NH_3)_6][Co(CO)_4]_2$$

was formed by the procedure of Hieber et al., Z. anorg. u. allgem. Chem., 232, 17 (1937). To a reactor was charged 0.0015 mole of dicobalt octacarbonyl and 0.017 mole of

TABLE I

| | | | | | | Amide product | | | |
|---|---|---|---|---|---|---|---|---|---|
| (CH$_3$)$_3$N, moles | NH$_3$, moles | Co$_2$(CO)$_8$, moles × 10$^3$ | CO, p.s.i.g. | Time, hrs. | Temp., °C. | Total, g. | DMF, percent wt. | NMF, percent wt. | DMAC, percent wt. |
| 0.034 | 0.017 | 1.5 | 2,000 | 16 | 225 | 2.20 | 77 | 14 | 3 |
| 0.034 | 0.017 | 1.4 | 1,900 | 66 | 200 | 2.51 | 78 | 17 | 1 |
| 0.068 | 0.034 | 1.6 | 2,000 | 66 | 225 | 3.61 | 83 | 16 | 1 |
| 0.034 | 0.017 | 1.5 | 2,000 | 2 | 225 | 0.34 | 83 | 15 | 2 |
| 0.034 | 0.085 | 0.35 | 2,000 | 16 | 225 | 0.80 | 80 | 18 | 1 |
| 0.034 | 0.017 | 0.38 | 2,100 | 16 | 250 | 1.58 | 65 | 10 | 11 | ammonia and the resulting mixture was maintained at 40° C. for approximately 2 hours. The mixture was then cooled to −80° C. to condense the excess ammonia and the 0.0038 mole of carbon monoxide liberated by reaction of the ammonia with the dicobalt octacarbonyl was removed. To the reactor was added 0.034 mole of trimethylamine and the reactor was pressurized with carbon monoxide to 1200 p.s.i.g. at room temperature and maintained at 225° C. for 16 hours. The resulting product mixture was examined according to the procedure of Example I. The total amide product, 2.1 g., was found to contain 77% wt. dimethylformamide, 12% wt. N-methylformamide and 3% wt. dimethylacetamide.

EXAMPLE VI

The complex of the formula $$[Co(C_5H_5N)_6][Co(CO)_4]_2$$

was prepared according to the procedure of Wender et al., J. Am. Chem. Soc., 74, 1216 (1952), by reacting 0.0015 mole of dicobalt octacarbonyl with a stoichiometric amount, 0.465 g., of pyridine at 40° C. for 2 hours. The resulting product was contacted with 0.034 mole of trimethylamine, 0.017 mole of ammonia and 2000 p.s.i.g. of carbon monoxide at 225° C. and the reaction mixture was maintained at that temperature for 16 hours. The resulting product mixture was examined according to the procedure of Example I. The total product, 2.1 g., was found to contain approximately 19% wt. pyridine. The amide product, 1.7 g., was found to contain 75% wt. dimethylformamide, 15% wt. N-methylformamide and 5% wt. dimethylacetamide.

I claim as my invention:

1. The process of producing dimethylformamide by intimately contacting in a carbonylation zone (a) a mixture of trimethylamine and ammonia, the molar ratio of trimethylamine to ammonia being from about 1:10 to about 10:1, (b) carbon monoxide and a cobalt carbonyl complex catalyst selected from dicobalt octacarbonyl and $[Co(E)_6][Co(CO)_4]_2$ wherein E independently is ammonia, methylamine, dimethylamine or trimethylamine, the molar ratio of said cobalt carbonyl complex to trimethylamine being from about 1:100 to about 1:1, at a temperature from about 150° C. to about 275° C. and a pressure from about 1000 p.s.i.g. to about 6000 p.s.i.g., in an inert reaction environment; and recovering dimethylformamide from the resulting amide-containing product mixture.

2. The process of claim 1 wherein the cobalt carbonyl complex is dicobalt octacarbonyl.

3. The process of claim 1 wherein the catalyst is represented by the formula $$[Co(E)_6][Co(CO)_4]_2$$

wherein E independently is ammonia, methylamine, dimethylamine or trimethylamine.

4. The process of claim 1 wherein the temperature is from about 175° C. to about 250° C. and the pressure is from about 1500 p.s.i.g. to about 2500 p.s.i.g.

5. The process of producing dimethylformamide by initially contacting ammonia and trimethylamine, the molar ratio of ammonia to trimethylamine being from about 1:10 to about 10:1, in the pressure of an acidic, normally solid, heterogeneous, inorganic oxide catalyst of at least two atoms other than oxygen, at least one of which is a metal, said inorganic oxide catalyst being present in an amount from about 0.1% by weight to about 25% by weight, based on weight of total mixture, and said inorganic oxide catalyst being selected from heteropoly acids, synthetic siliceous refractory oxides and mixed oxides wherein one element other than oxygen is present in the anion, at a temperature from about 300° C. to about 550° C. and a pressure from about 1 atmosphere to about 500 atmospheres; contacting the resulting product mixture with carbon monoxide and a cobalt carbonyl complex catalyst selected from dicobalt octacarbonyl and $[Co(E)_6][Co(CO)_4]_2$ wherein E independently is ammonia, methylamine, dimethylamine or trimethylamine, the molar ratio of said cobalt carbonyl complex to trimethylamine being from about 1:100 to about 1:1, at a temperature from about 150° C. to about 275° C. and a pressure from about 1000 p.s.i.g. to about 6000 p.s.i.g., in an inert reaction environment; and recovering dimethylformamide from the resulting amide-containing product mixture.

6. The process of claim 5 wherein the inorganic oxide catalyst is a synthetic siliceous refractory oxide.

7. The process of claim 6 wherein the siliceous refractory oxide is silica-magnesia.

8. The process of claim 5 wherein the recovery of the dimethylformamide comprises a vapor-phase removal of dimethylformamide.

References Cited

FOREIGN PATENTS 948,056   8/1956   Germany.

ALEX MAZEL, *Primary Examiner.*

J. A. NARCAVAGE, *Assistant Examiner.*

U.S. Cl. X.R.

252—472